US012050423B2

(12) United States Patent
Gofuku

(10) Patent No.: US 12,050,423 B2
(45) Date of Patent: Jul. 30, 2024

(54) DRIVE MECHANISM AND IMAGE FORMING APPARATUS

(71) Applicant: CANON KABUSHIKI KAISHA, Tokyo (JP)

(72) Inventor: Shuichi Gofuku, Shizuoka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 56 days.

(21) Appl. No.: 18/068,018

(22) Filed: Dec. 19, 2022

(65) Prior Publication Data

US 2023/0195016 A1 Jun. 22, 2023

(30) Foreign Application Priority Data

Dec. 20, 2021 (JP) ................................ 2021-205742

(51) Int. Cl.
*G03G 15/00* (2006.01)
*G03G 15/08* (2006.01)

(52) U.S. Cl.
CPC ..... *G03G 15/5008* (2013.01); *G03G 15/0868* (2013.01); *G03G 15/602* (2013.01); *G03G 15/657* (2013.01)

(58) Field of Classification Search
CPC ............. G03G 15/5008; G03G 15/602; G03G 15/0868; G03G 15/657
See application file for complete search history.

(56) References Cited

U.S. PATENT DOCUMENTS

| | | | | |
|---|---|---|---|---|
| 9,098,019 | B2 | 8/2015 | Ishido | |
| 10,527,969 | B1 * | 1/2020 | Williamson | G03G 15/0865 |
| 2005/0163530 | A1 * | 7/2005 | Miller | G03G 15/0877 399/113 |
| 2006/0062600 | A1 * | 3/2006 | Chang | G03G 15/104 399/237 |
| 2012/0328336 | A1 * | 12/2012 | Ota | G03G 21/1857 403/376 |

(Continued)

FOREIGN PATENT DOCUMENTS

| | | |
|---|---|---|
| JP | H05224568 A | 9/1993 |
| JP | H10220550 A | 8/1998 |

(Continued)

*Primary Examiner* — Sevan A Aydin
(74) *Attorney, Agent, or Firm* — ROSSI, KIMMS & McDOWELL LLP

(57) ABSTRACT

In a drive mechanism, a first engagement portion of a drive member includes a first contact portion capable of contacting with a second engagement portion in a case where a coupling member is at a first position and the drive member rotates in a first rotation direction, a second contact portion capable of contacting with the second engagement portion in a case where the coupling member is at a second position and the drive member rotates in the first rotation direction, and a third contact portion capable of contacting with the coupling member so as to regulate movement of the second engagement portion from the second position to the first position in a rotation axis direction when the coupling member is at the second position and the second contact portion and the coupling member are in a contact state by rotation of the drive member in the first rotation direction.

11 Claims, 12 Drawing Sheets

(56) References Cited

U.S. PATENT DOCUMENTS

| | | | | |
|---|---|---|---|---|
| 2016/0070199 | A1* | 3/2016 | Oh | F16H 1/20 399/258 |
| 2018/0348698 | A1* | 12/2018 | Tamaki | G03G 21/1676 |
| 2021/0018865 | A1* | 1/2021 | Matsumoto | G03G 15/6511 |
| 2021/0026296 | A1* | 1/2021 | Takahashi | G03G 15/0865 |

FOREIGN PATENT DOCUMENTS

| | | | | | |
|---|---|---|---|---|---|
| JP | 2012008381 | A | | 1/2012 | |
| JP | 2015125209 | A | | 7/2015 | |
| JP | 2021018359 | A | * | 2/2021 | G03G 15/0865 |

* cited by examiner

DRIVE MECHANISM AND IMAGE FORMING APPARATUS

BACKGROUND OF THE INVENTION

Field of the Invention

The present invention relates to a powder conveying device which conveys powder such as toner and an electrophotographic image forming apparatus such as a printer, a copier, a facsimile and the like having the powder conveying device.

Description of the Related Art

Conventionally, in an electrophotographic image forming apparatus such as a printer, a copier, a facsimile and the like, there can be such a case where a toner image formed on a photosensitive drum, an intermediate transfer belt or the like is not completely transferred to a recording medium such as a sheet, and the toner remains on the photosensitive drum, the intermediate transfer belt or the like. The residual toner remaining on the photosensitive drum, the intermediate transfer belt or the like is removed from the photosensitive drum, the transfer belt or the like by a cleaning unit and is conveyed by a toner conveying unit to a toner accommodating container disposed inside an apparatus main body. Then, when the toner accommodating container is filled with the residual toner, a user replaces the toner containing container with a new toner containing container.

As described in Japanese Patent Application Publication No. 2015-125209, a method of changing drive by using a ratchet mechanism has been conventionally used as a drive method for the toner conveying unit. The ratchet mechanism is constituted by an engagement portion of a drive member (drive component), an engagement portion of a driven member (driven component), and an inclined portion of the driven member. When the drive member rotates forward, each of the engagement portions is engaged with each other and transmits the drive. When the drive member rotates reversely, the engagement portion of the drive member rides over an inclined surface of the inclined portion of the driven member, either one of the drive member and the driven member moves to an axial direction of a rotating axis, and the drive is disengaged. When the drive member drives with the forward rotation again after the reverse rotation, if the member which has moved in the axial direction of the rotating axis is not returned to a position before the movement, the engagement portion of the drive member and the engagement portion of the driven member do not engage with each other and thus, the drive cannot be transmitted. Therefore, the ratchet mechanism which, rotates the drive member forward and reversely and switches the drive, requires a moving member which returns the member which has moved in the axial direction of the rotating axis to the position before the movement. As a method of the moving member, a method is known with which a member is continuously pressed by using a biasing member such as a spring in a direction toward the position before the movement so as to move the member.

SUMMARY OF THE INVENTION

When the biasing member is used as the moving member, the member, i.e., either one of the drive member and the driven member, which has moved, is pressed by the biasing member in the direction toward the position before the movement. Here, assume that the driven member moves in the axial direction of the rotating axis. When the driven member moves by pressing by the biasing member from the position after the movement to the position before the movement, a sound of collision between the drive member and the driven member is generated. Since the collision sound is generated at each rotation of the ratchet mechanism particularly in the reverse rotation when the drive is disengaged, the noisy collision sound is not desirable for the user.

Thus, the present invention has an object to provide an art which can reduce a sound during drive in a drive mechanism used in an image forming apparatus.

In order to achieve the above mentioned object, a drive mechanism used in an image forming apparatus of the present invention includes the following:

- a rotatable drive member having a first engagement portion;
- a coupling member having a second engagement portion engaged with the first engagement portion and a drive transmitting portion, the coupling member being constituted to be rotatable by receiving a drive force from the drive member in the second engagement portion and movable between a first position and a second position in a rotation axis direction of the drive member;
- a biasing member disposed between the drive member and the coupling member in the rotation axis direction, the biasing member biasing the coupling member from the second position toward the first position; and
- a driven member having a first drive transmitted portion capable of contacting with the drive transmitting portion which moves along the first rotation direction in a case where the coupling member is at the first position and the drive member rotates in a first rotation direction, the driven member being constituted to be rotatable in the first rotation direction by receiving the drive force from the coupling member in the first drive transmitted portion, wherein
- the first engagement portion includes:
  - a first contact portion capable of contacting with the second engagement portion in a case where the coupling member is at the first position and the drive member rotates in the first rotation direction;
  - a second contact portion capable of contacting with the second engagement portion in a case where the coupling member is at the second position and the drive member rotates in the first rotation direction; and
  - a third contact portion capable of contacting with the second engagement portion so as to regulate movement of the coupling member from the second position to the first position in the rotation axis direction in a case where the coupling member is at the second position and the second contact portion and the coupling member are in a contact state by rotation of the drive member in the first rotation direction.

Further features of the present invention will become apparent from the following description of exemplary embodiments with reference to the attached drawings.

DESCRIPTION OF THE EMBODIMENTS

Figure 1A:
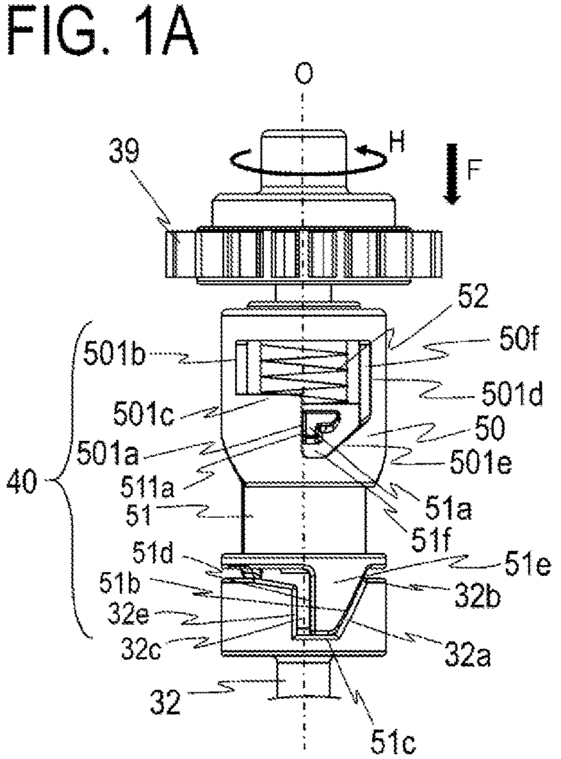
FIGS. 1A to 1D are schematic diagrams illustrating details of a ratchet mechanism in an embodiment 1 of the present invention.

Referring to the drawings, forms for carrying out the present invention will be described in detail by way of example on the basis of an embodiment example. Note that dimensions, materials, shapes, relative positioning, and the like of components described in each of embodiments are to be appropriately changed in accordance with configurations of an apparatus and a device to which the invention is applied and various conditions, and are therefore not intended to limit the scope of the invention to the following embodiments.

Embodiment 1

Figure 2:
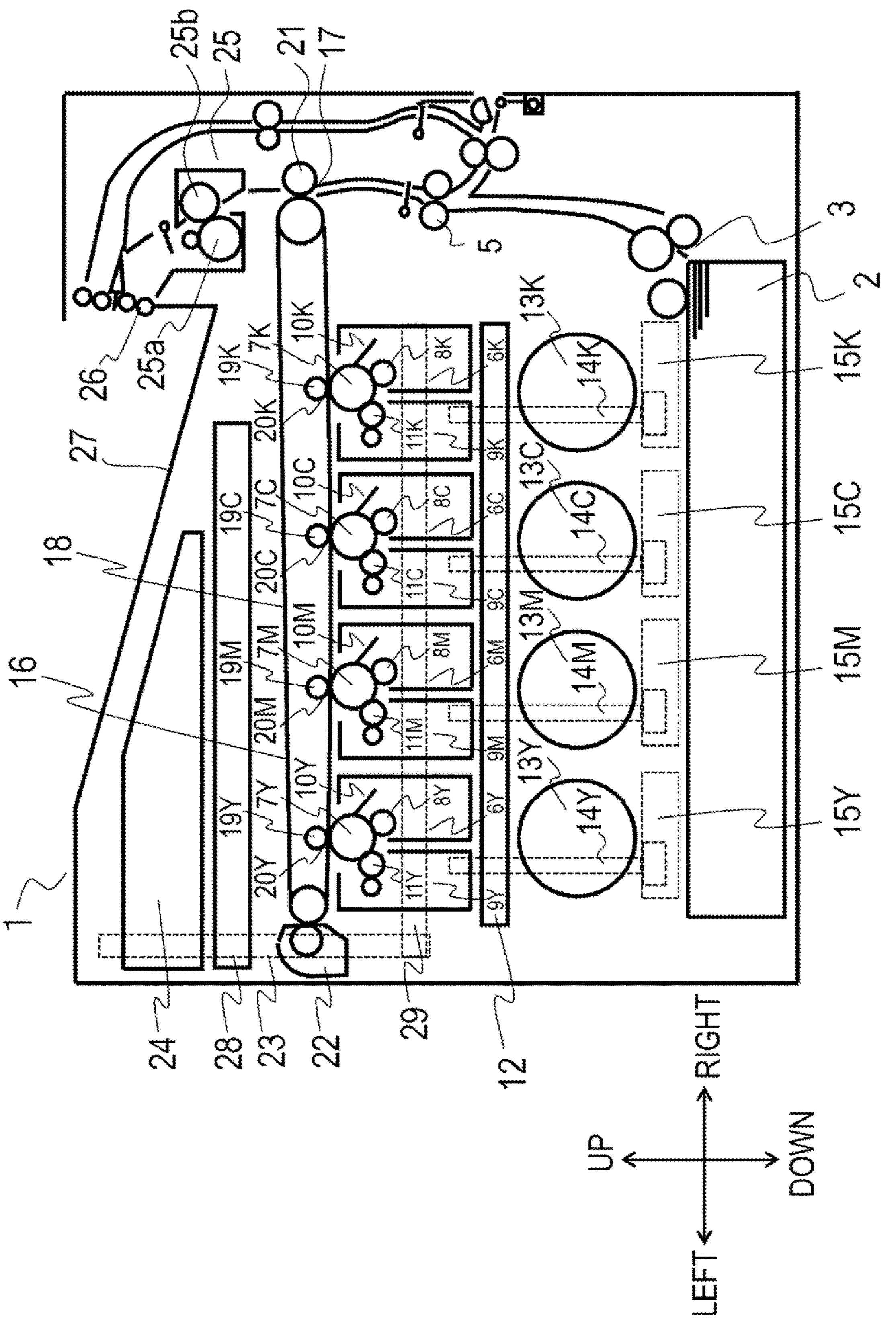
FIG. 2 is a main sectional view of an entire configuration of an image forming apparatus according to the embodiment 1 of the present invention, when seen from a front direction.
Figure 3:
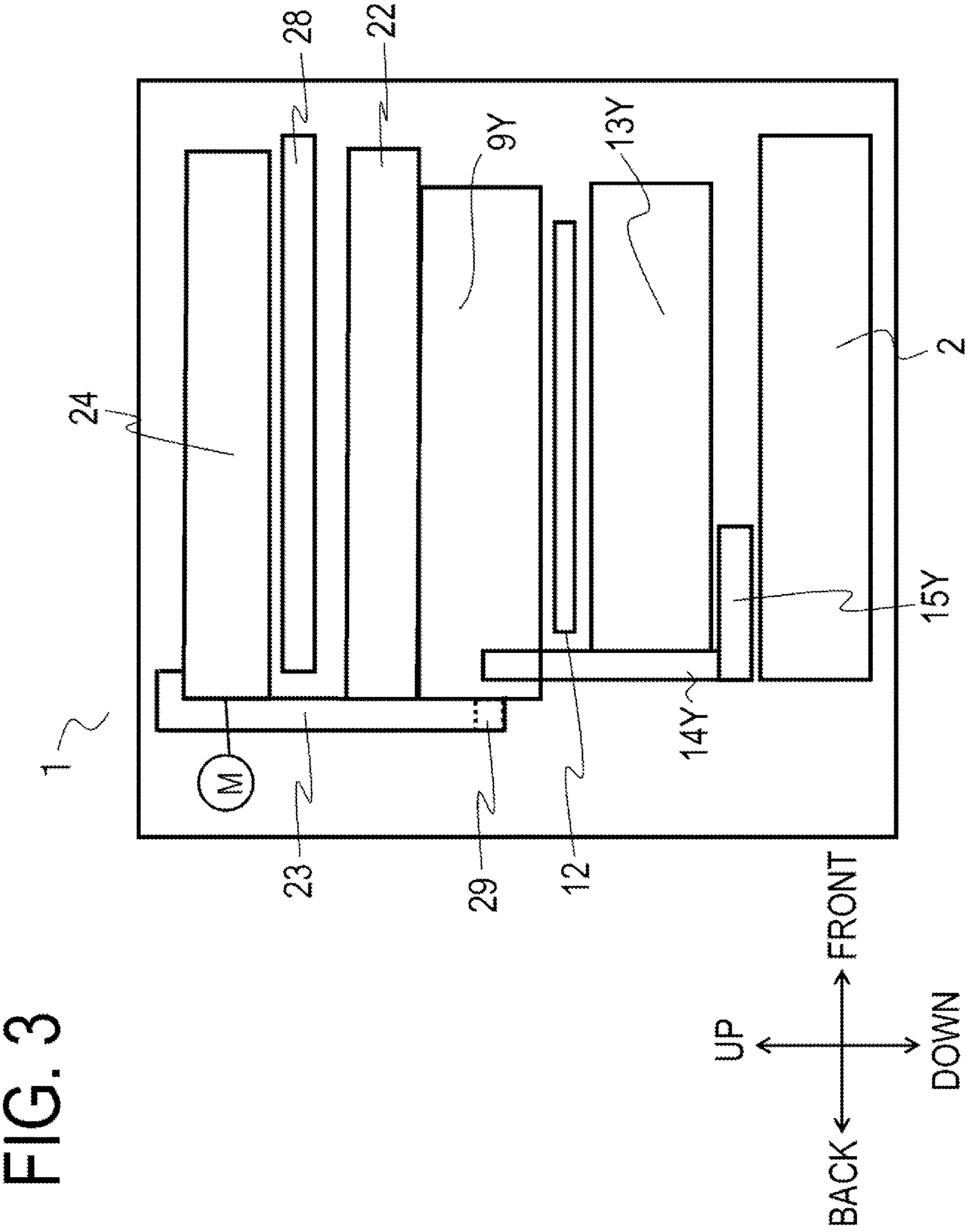
FIG. 3 is a main sectional view of the entire configuration of the image forming apparatus according to the embodiment 1 of the present invention, when seen from a left front direction.

An image forming apparatus 1 according to an embodiment 1 of the present invention will be described. FIG. 2 is a main sectional view of an entire configuration of the image forming apparatus 1, when seen from front of the image forming apparatus 1. FIG. 3 is a main sectional view of the entire configuration of the image forming apparatus 1, when seen from a left direction of the image forming apparatus 1. Regarding directions of the illustrated image forming apparatus 1, an up-down direction is a gravity direction, and a left-right direction and a front-back direction are horizontal directions. FIGS. 2 and 3 illustrate the configuration of the image forming apparatus 1 in a state where the image forming apparatus 1 is placed on a horizontal installation surface as a usually assumed installation state, and the left-right direction on the paper corresponds to the horizontal direction, and the up-down direction on the paper corresponds to the apparatus up-down direction, respectively.

Sheet Supply

In a lower part of the image forming apparatus 1, a cassette 2 is accommodated capable of being withdrawn. In the cassette 2, recording materials such as paper, sheet and the like are accommodated. The recording materials are separated and fed one by one by means of rotation of a cassette paper-feed portion 3 disposed in the vicinity of a distal end part of the recording material. After that, they are conveyed by a resist roller 5 to downstream.

Image Forming Portion

The image forming apparatus 1 includes an image forming portion 6 as an image forming unit in which image forming stations 6Y, 6M, 6C, 6K corresponding to each color of yellow (Y), magenta (M), cyan (C), black (K) aligned in a lateral row. In the image forming portions 6, photosensitive drums 7Y, 7M, 7C, 7K (hereinafter noted as a photosensitive drum 7), which are image carrying members and charging devices 8Y, 8M, 8C, 8K (charging device 8) which uniformly charge a surface of the photosensitive drums 7 are provided. Moreover, in the image forming portions 6, developing apparatuses 9Y, 9M, 9C, 9K (developing apparatus 9) which cause toner to adhere to an electrostatic latent image and develop as a toner image (developer image) are provided. Furthermore, photosensitive-member cleaning blades 10Y, 10M, 10C, 10K (photosensitive-member cleaning blade 10) which remove a residual toner remaining on the photosensitive drum 7 are provided in the image forming portion 6.

In the developing apparatus 9, developing rollers 11Y, 11M, 11C, 11K (developing roller 11) corresponding to each of the colors are provided with a configuration capable of contacting/separation with respect to each of the photosensitive drums 7. By causing the developing roller 11 to contact/separate in accordance with an image which was made an electrostatic latent image, that is, in accordance with presence/absence of necessity of development, a life of the developing roller 11 is improved. And a scanner unit 12 which forms an electrostatic latent image on the photosensitive drum 7 by emitting a laser beam on the basis of image information is provided on a lower part of the image forming portion 6.

The image forming stations 6Y, 6M, 6C, 6K are constituted capable of attachment/detachment with respect to an apparatus main body of the image forming apparatus 1 as process cartridges. The process cartridge is constituted with the developing apparatus 9 including the developing roller 11 and a photosensitive-member unit including the photosensitive drum 7, the charging device 8, and the photosensitive-member cleaning blade 10 individually or the both of them integrally, capable of attachment/detachment with respect to the apparatus main body.

In this embodiment, the developing apparatus 9 has its own toner accommodation chamber and is constituted such that a toner supplied from a replenishing toner container (toner cartridge) 13 as an accommodating portion is replenished to the toner accommodating chamber. Here, the apparatus main body of the image forming apparatus 1 refers to a constituting part excluding the configuration capable of attachment/detachment with respect to the image forming apparatus 1 such as the process cartridges, the replenishment toner container 13 and the like described above.

Transfer

Above the developing apparatus 9, an intermediate transfer unit 16 is provided. The intermediate transfer unit 16 is disposed substantially horizontally with a side (primary transfer portion 20 side) opposing each of the image forming stations (image forming portions) 6 downward. An intermediate transfer belt 18 opposing each of the photosensitive drums 7 is a rotatable endless belt and is stretched between a plurality of stretching rollers. On an inner surface side of the intermediate transfer belt 18, primary transfer rollers

19Y, 19M, 19C, 19K (primary transfer roller 19) are disposed as primary transfer members. Each of the primary transfer rollers 19 is disposed at a position forming primary transfer portions 20Y, 20M, 20C, 20K (primary transfer portion 20) with each of the photosensitive drums 7 through the intermediate transfer belt 18, respectively. By means of the primary transfer roller 19 to which a voltage is applied in each of the primary transfer portions 20, a toner image is transferred from each of the photosensitive drums 7 to the intermediate transfer belt 18. In this embodiment, a unit including the intermediate transfer belt 18, the plurality of stretching rollers between which the intermediate transfer belt 18 is stretched, and each of the primary transfer rollers 19 is constituted as an intermediate transfer unit 16 capable of attachment/detachment with respect to the apparatus main body.

The toner image developed at each of the image forming stations is transferred in the primary transfer portion 20 to the intermediate transfer belt 18, and by continuously transferring each color, the toner image formed in four colors is formed on a surface of the intermediate transfer belt 18, and it is conveyed to a secondary transfer portion 17.

A secondary transfer roller 21, which is a secondary transfer member, contacts the intermediate transfer belt 18 and forms the secondary transfer portion 17 together with a roller on an opposed side through the intermediate transfer belt 18. In the secondary transfer portion 17, the toner image having been transferred onto the intermediate transfer belt 18 is secondarily transferred to the recording material. The toner which has not been completely transferred to the recording material in the secondary transfer and remained on the intermediate transfer belt 18 is removed by a cleaning unit 22. The toner having been removed by the cleaning unit 22 is conveyed to a toner collecting container 24 via a collected-toner conveying portion 23 and is accumulated. The toner which has not been completely transferred to the intermediate transfer belt 18 on the photosensitive drum 7 is conveyed to the collected-toner conveying portion 23 via a cartridge collected-toner conveying portion 29 and is conveyed to the toner collecting container 24.

Fixation, Paper Discharge

The recording material on which an unfixed toner image has been transferred is further conveyed to downstream, pressurized and heated by a heating unit 25*a* and a pressurizing roller 25*b* of a fixing apparatus 25, and the toner image is fixed on the recording material by melting of the toner. After that, the recording material is conveyed to a discharge roller pair 26 and is discharged onto a paper-discharge tray 27. Image formation on the surface of the recording material is performed by this series of operations.

Toner Replenishment

Below the image forming portion 6 and between the scanner unit 12 and the cassette 2, replenishment toner containers 13Y, 13M, 13C, 13K (replenishment toner container 13) which replenish a toner to each of the image forming stations (image forming portions) 6 are attachably and detachably disposed substantially horizontally. The replenishment toner container 13 is also called a toner replenishment cartridge and accommodates a toner. Inside the replenishment toner container 13 is filled with a toner for replenishment corresponding to each of the colors. The toner conveying devices 14Y, 14M, 14C, 14K (toner conveying device 14) convey toner received from the replenishment toner container 13 upward in accordance with toner consumption in the image forming portion 6 and supply the toner to the developing apparatus 9. The toner conveying device 14 conveys the toner to be used for image formation. The toner conveying device 14 as a toner conveying portion is driven by toner-conveying drive devices 15Y, 15M, 15C, 15K (toner-conveying drive device 15) as drive units disposed on a lower part of the toner conveying device 14. The toner-conveying drive device 15 includes a motor as a power source for providing a drive force for driving each screw of the toner conveying device 14 to the toner conveying device 14, a gear as a drive transmitting unit and the like.

Power-Supply Device

On a rear surface side of the image forming apparatus 1, a low-voltage power-supply device (not shown) which supplies a voltage to various motors (including a motor M, which will be described later), a fan, and a control portion such as a solenoid and the like provided in the image forming apparatus 1 is disposed. Moreover, in a space between the intermediate transfer belt 18 and the toner collecting container 24, a high-voltage power-supply device 28 which applies a high voltage to the charging device 8, the developing apparatus 9, the primary transfer roller 19, the secondary transfer roller 21 and the like is disposed.

Toner Collecting Unit into Toner Collecting Container

Figure 4B:
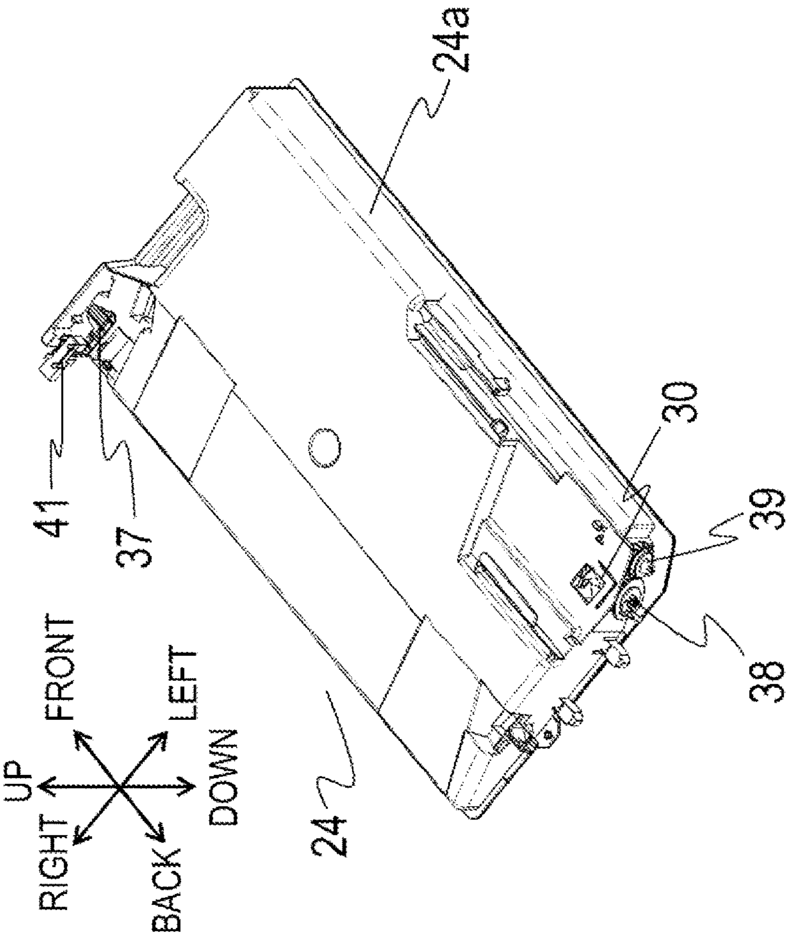
FIGS. 4A and 4B are views illustrating an entire configuration of a toner collecting unit in the embodiment 1 of the present invention.
Figure 4A:
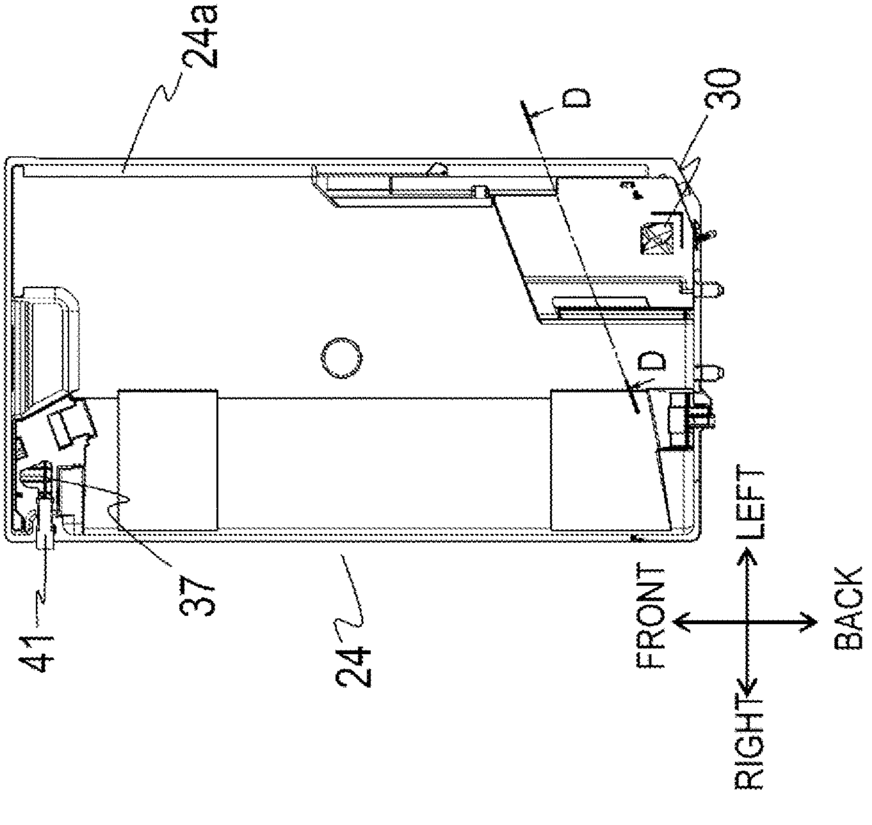
Figure 5B:
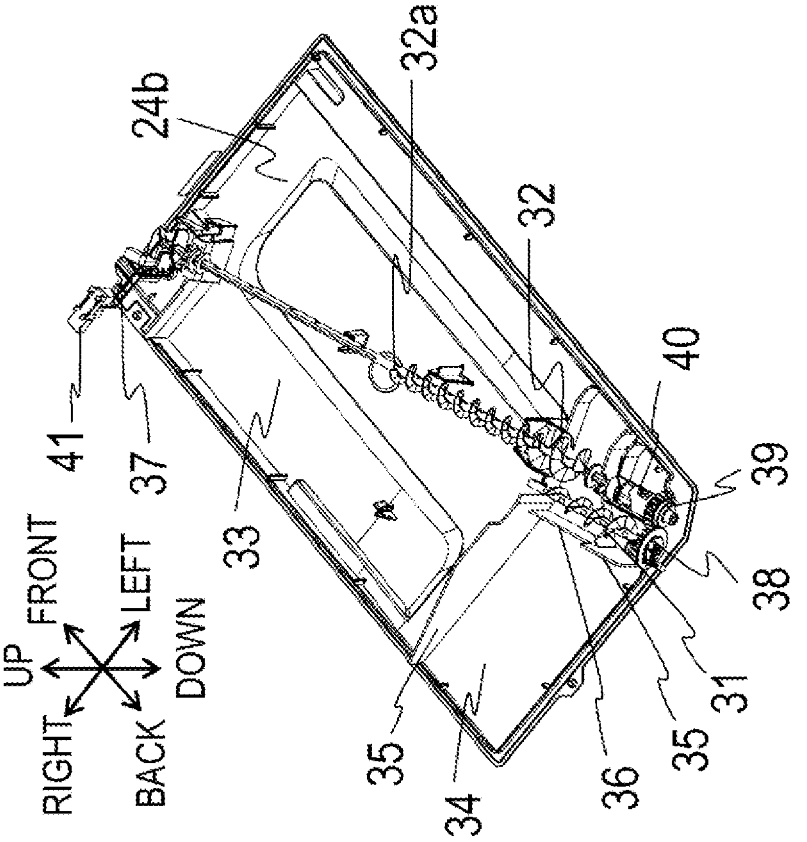
FIGS. 5A and 5B are views illustrating the entire configuration of the toner collecting unit in the embodiment 1 of the present invention.
Figure 5A:
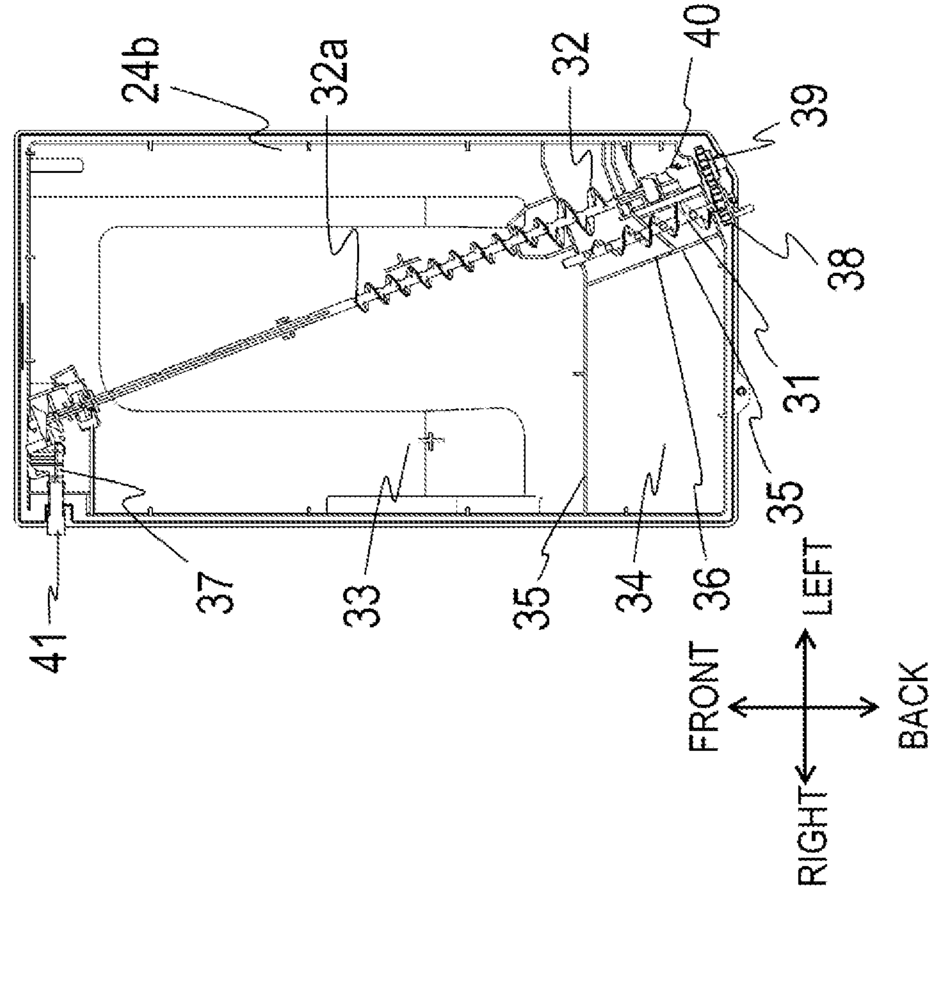

FIG. 4A is a plan view of the toner collecting container 24 when seen from above. FIG. 4B is a perspective view of the toner collecting container 24 when seen from diagonally above. FIG. 5A is a plan view of a state in which a collecting-container upper part 24*a* of the toner collecting container 24 is removed when seen from above. FIG. 5B is a perspective view of a state in which the collecting-container upper part 24*a* of the toner collecting container 24 is removed when seen from diagonally above.

The toner collecting container 24 forms an internal space as an accommodating portion which collects the toner by connecting the collecting-container upper part 24*a* and a collecting-container lower part 24*b* with each other. The toner collecting container 24 includes a toner supply port 30 which receives the toner conveyed by the collected-toner conveying portion 23 (see FIG. 3) into the internal space in the collecting-container upper part 24*a*.

The internal space of the toner collecting container 24 is divided into a first accommodating chamber 33 and a second accommodating chamber 34 by a partition 35. In the partitioned internal spaces, the one with a smaller capacity is the second accommodating chamber 34, and the internal space other than the second accommodating chamber 34 is the first accommodating chamber 33. In the partition 35, a communication port 36 through which the first accommodating chamber 33 and the second accommodating chamber 34 communicate with each other is disposed. Below the toner supply port 30, a first screw 31 as a toner conveying member is disposed. At a position aligned in parallel with the first screw 31, a second screw 32, which is a rotatably supported rotating body, is disposed. The first screw 31 and the second screw 32 extend in a horizontal direction in the internal space of the toner collecting container 24, respectively. The second screw 32 is longer in a direction of a rotation axis than the first screw 31 and extends to a vicinity of a center of the first accommodating chamber 33. A position of the communication port 36 is located on a side opposite to the second screw 32 with the first screw 31 as a reference. On a downstream of the second screw 32, a lever 37, which is a detecting member interlocking with the second screw 32 is disposed.

Figure 6A:
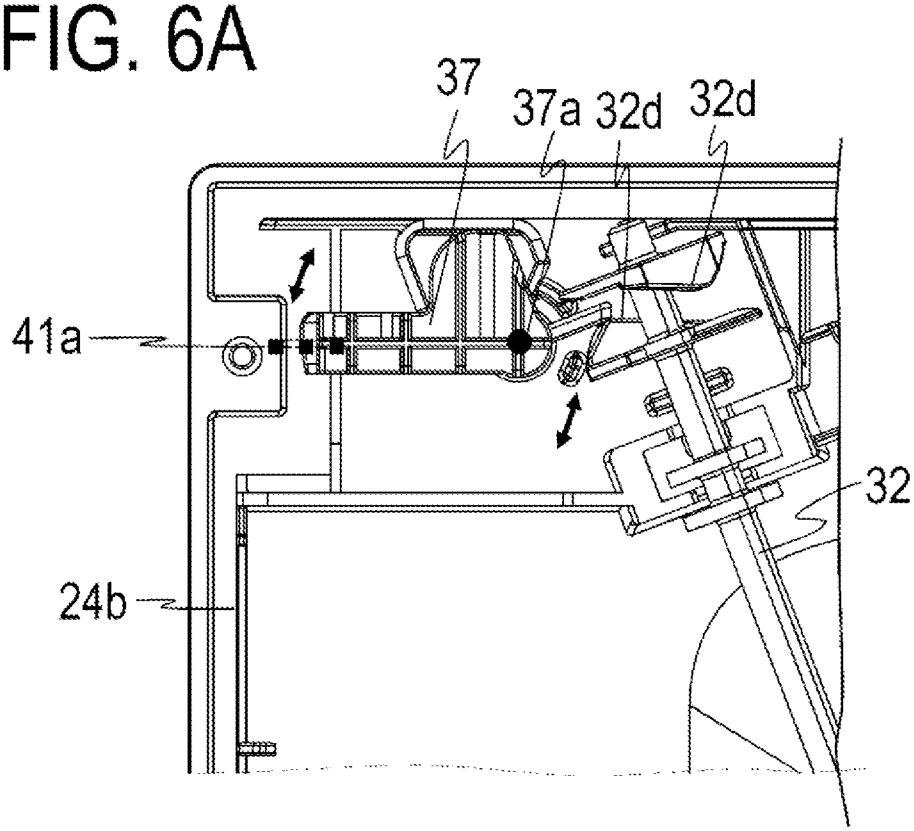
FIGS. 6A and 6B are explanatory views related to a toner detection mechanism in the embodiment 1 of the present invention.
Figure 6B:
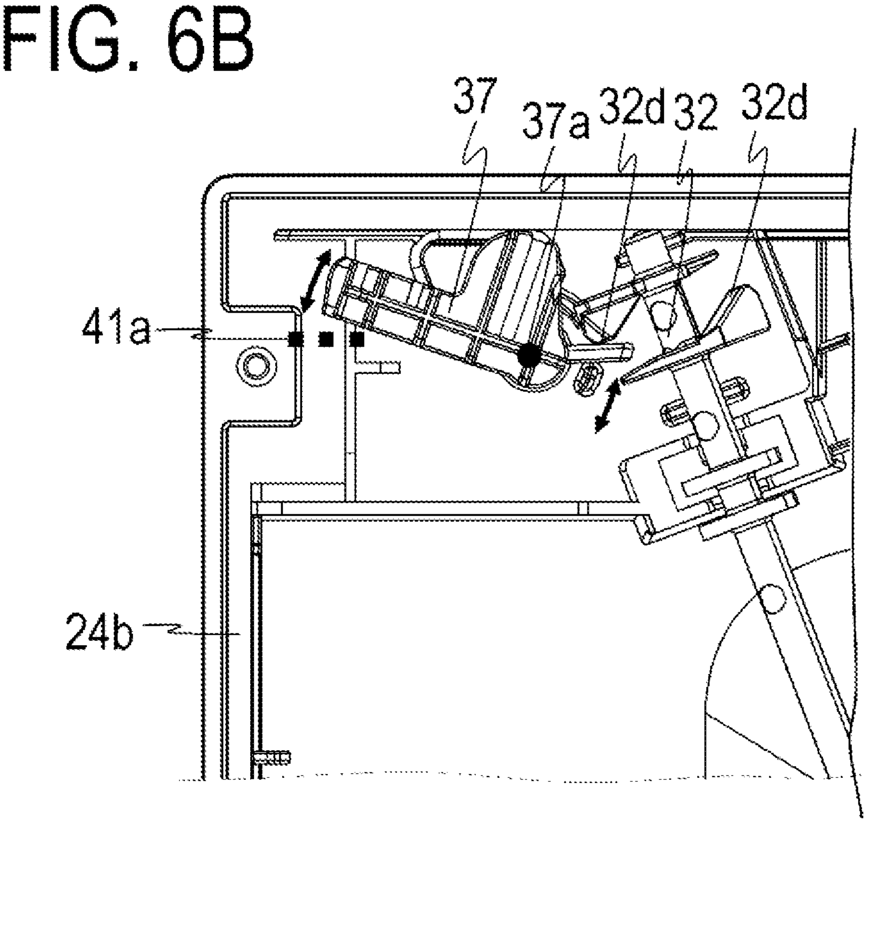
Figure 7:
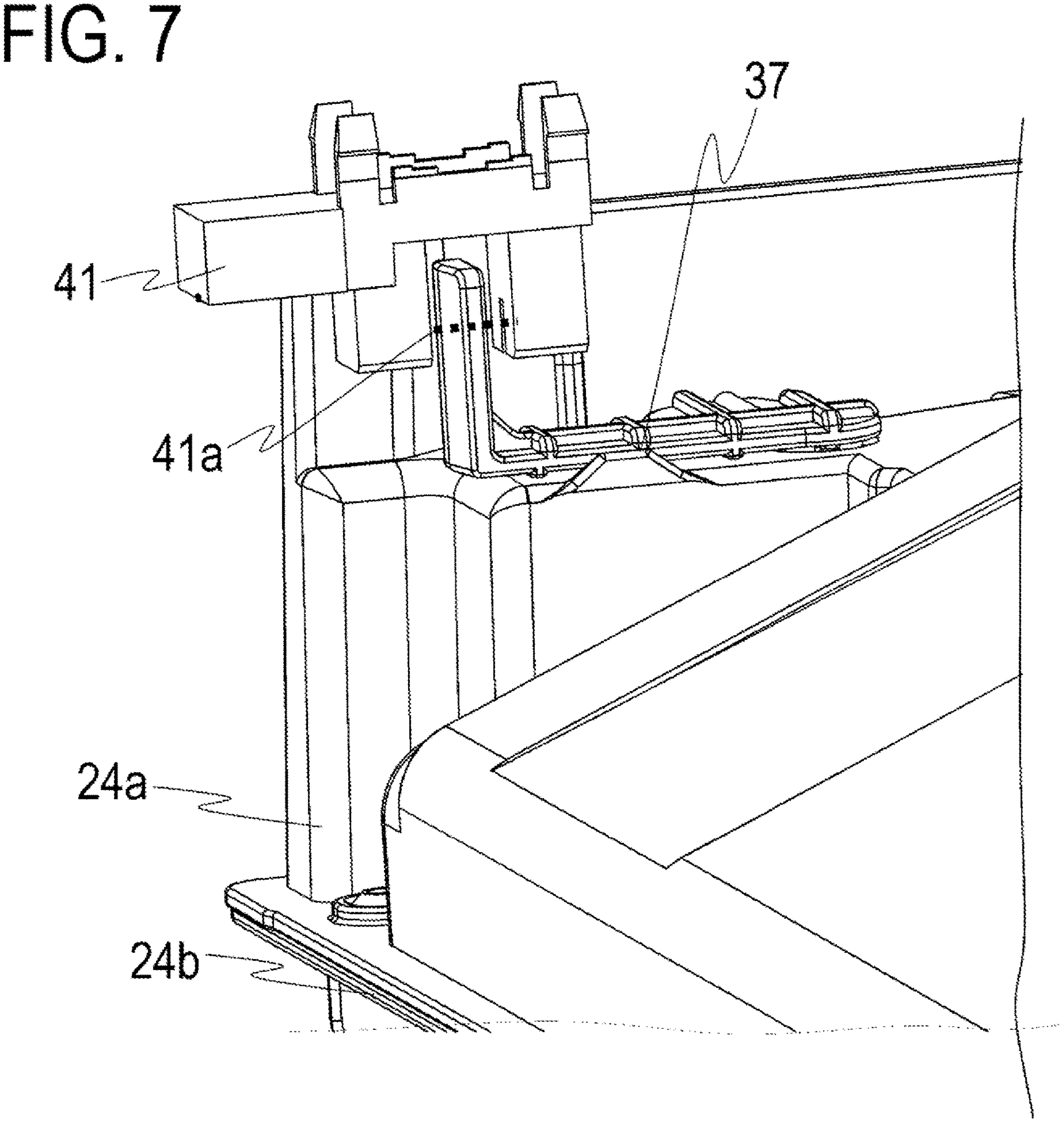
FIG. 7 is an explanatory view related to the toner detection mechanism in the embodiment 1 of the present invention.

FIGS. 6A and 6B are enlarged plan views for explaining a behavior of the lever 37, and FIG. 7 is an enlarged perspective view of a vicinity of a photosensor 41 and the lever 37. The photosensor 41 is supported by the image forming apparatus 1 (not shown). The lever 37 interlocks with a cam 32*d* of the second screw 32 so as to make a reciprocating motion between a position which light-shields an optical axis 41*a* of the photosensor 41 and a position where the optical axis 41*a* of the photosensor 41 is not shielded but light is transmitted. The lever 37 rotationally moves around a lever center 37*a* and makes the reciprocating motion. Here, FIGS. 6A and 6B illustrate a state where the collecting-container upper part 24*a* is removed for explanation. When the second screw 32 makes a rotation, the lever 37 reciprocates once.

Ratchet Mechanism

A configuration of a ratchet mechanism 40, which is a feature of this embodiment, will be explained. The first screw 31 couples with a drive transmission gear 38, and the first screw 31 is driven by driving the drive transmission gear 38 by a drive portion (not shown) including the motor M, which is a DC brushless motor, for example, as a drive source. A driven gear 39 is supported rotatably around a rotation axis O and is driven by engaging with the drive transmission gear 38. The second screw 32 is supported rotatably around the rotation axis O and is driven by coupling with the driven gear 39 through the ratchet mechanism 40, which is a rotation regulating unit.

FIG. 1A shows a detailed view illustrating a configuration of the ratchet mechanism 40 as the drive mechanism of this embodiment. The ratchet mechanism 40 is constituted by a drive member (drive component) 50, a coupling member (coupling component) 51, a spring 52 as a biasing member, a rotating-side inclined surface 32*a* of the second screw 32 as a rotating member (rotating component) or a driven member (driven component) and the like.

The drive member 50 is engaged with the driven gear 39 and rotates in an H direction as a first rotating direction around a rotation axis coaxially with the rotation axis O of the driven gear 39 by receiving a drive force from the driven gear 39. The drive member 50 is a cylindrical member. The coupling member 51 is disposed such that a part (insertion portion 51*f*) on the upstream side in a toner conveying direction F along the rotation axis O is accommodated in an inner cylinder portion of the drive member 50. On the downstream side in the toner conveying direction F of the coupling member 51, a drive transmitting portion for transmitting a drive force to the second screw 32 is provided. The coupling member 51 is supported rotatably around the rotation axis coaxially with the drive member 50 and movably between a first engagement position and a second engagement position, which will be described later, along the rotation axis direction. On the upstream side in the toner conveying direction F with respect to the coupling member 51, the spring 52 as the biasing member is provided between the drive member 50 and the coupling member 51. The coupling member 51 is biased (pressed) by a biasing force (elastic force) of the spring 52 toward the second screw 32 side, that is, the downstream side in the toner conveying direction F along the rotation axis O. This biasing direction is a direction from the second engagement position (position away from the second screw 32) toward the first engagement position (position close to the second screw 32) as a first axis direction.

The drive member 50 has an opening portion 50*f* in the cylinder portion, and a coupling-side engagement portion of the coupling member 51 having a rib-shaped protruding portion protruding in a radial direction from an outer peripheral surface of the insertion portion 51*f* of the coupling member 51 inserted into the cylinder portion of the drive member 50 is inserted to the opening portion 50*f*. That is, the coupling-side engagement portion of the coupling member 51 is opposed to an end surface of the opening portion 50*f* of the drive member 50 in a circumferential direction around the rotation axis of the drive member 50 and a direction along the rotation axis direction of the drive member 50. This end surface of the opening portion 50*f* of the drive member 50 functions as a drive-side engagement portion 501 (first engagement portion), that is, as various contact portions 501*a* to 501*e*, which will be described later. On the other hand, the coupling member 51 has, as the above mentioned protruding portion, an engagement rib 51*a* having a first contacted portion 511*a*, a second contacted portion 511*b*, a third contacted portion 511*c*, and a fourth contacted portion 511*d* constituted as the various contacted portions capable of contacting the contact portions 501*a* to 501*e*.

The drive member 50 has the first contact portion 501*a* to be engaged with the coupling member 51 as the first contact portion of the drive-side engagement portion 501. The coupling member 51 has the engagement rib 51*a* to be engaged with the drive member 50 as the coupling-side engagement portion (second engagement portion). The first contact portion 501*a* of the drive member 50 and the first contacted portion 511*a* of the engagement rib 51*a* of the coupling member 51 engage with each other in the H direction so that the coupling member 51 is rotated/driven by the drive member 50 in the H direction.

The coupling member 51 has a protruding portion 51*e* as a drive transmitting portion, extending to the downstream side in the toner conveying direction F, on the downstream side in the toner conveying direction F. A side surface on the downstream side in the H direction of the protruding portion 51*e* is a coupling-side inclined surface 51*b* as a drive inclined surface inclined such that the farther it extends toward the downstream side in the toner conveying direction F, it extends toward a J direction as a second rotation direction in a direction opposite to the H direction. A side surface on the downstream side in the J direction of the protruding portion 51*e* is a coupling-side side surface 51*d* extending along the rotation axis O.

The second screw 32 has a rotating-side inclined surface 32*a* as a first drive transmitted portion. The rotating-side inclined surface 32*a* is an inclined surface inclined such that the farther it extends toward the upstream side in the toner conveying direction F as a second axis direction, it extends toward the H direction. When the coupling member 51 is at the first engagement position, the coupling-side inclined surface 51*b* is opposed to the rotating-side inclined surface 32*a* of the second screw 32 in the H direction. When the coupling member 51 is rotated in the H direction by being driven by the drive member 50, the coupling-side inclined surface 51*b* and the rotating-side inclined surface 32*a* contact each other. When the rotating-side inclined surface 32*a* and the coupling-side inclined surface 51*b* contact each other in a state where the coupling member 51 is pressed to the second screw 32 side by the spring 52, a force by the spring 52 works between the inclined surfaces. The coupling member 51 is constituted to be maintained at the first engagement position while a reaction force that the coupling-side inclined surface 51*b* receives from the rotating-side inclined surface 32*a* is smaller than a biasing force of the spring 52 acting on the coupling member 51, while when the reaction force becomes larger than the biasing force, the coupling member moves to the second engagement position. That is, if the force required for the second screw 32 to be driven is smaller than the force working between the inclined surfaces by the spring 52, the second screw 32 is driven by the coupling member 51.

Figure 8:
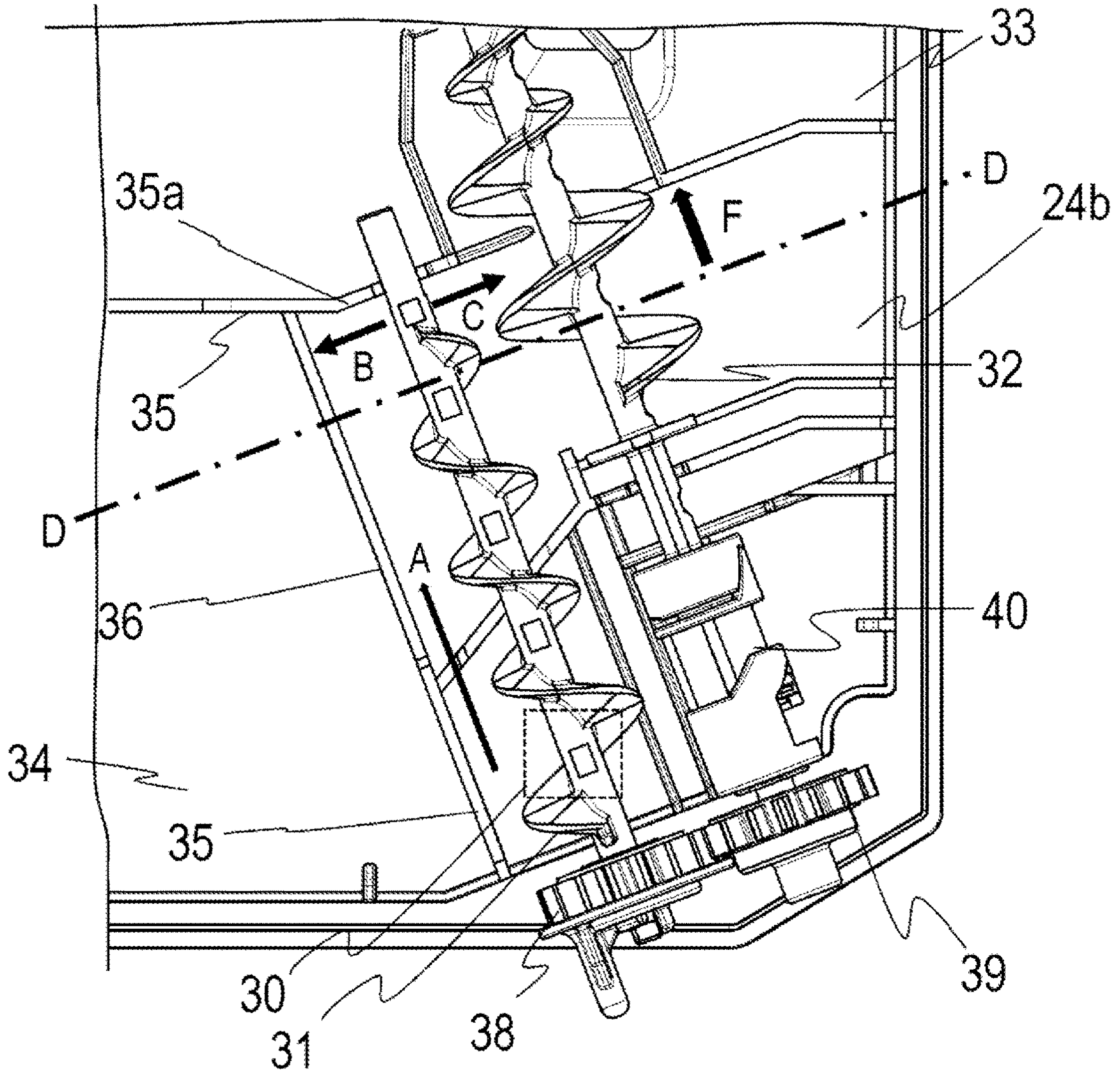
FIG. 8 is a view illustrating a state of toner collection in the embodiment 1 of the present invention.
Figure 9:
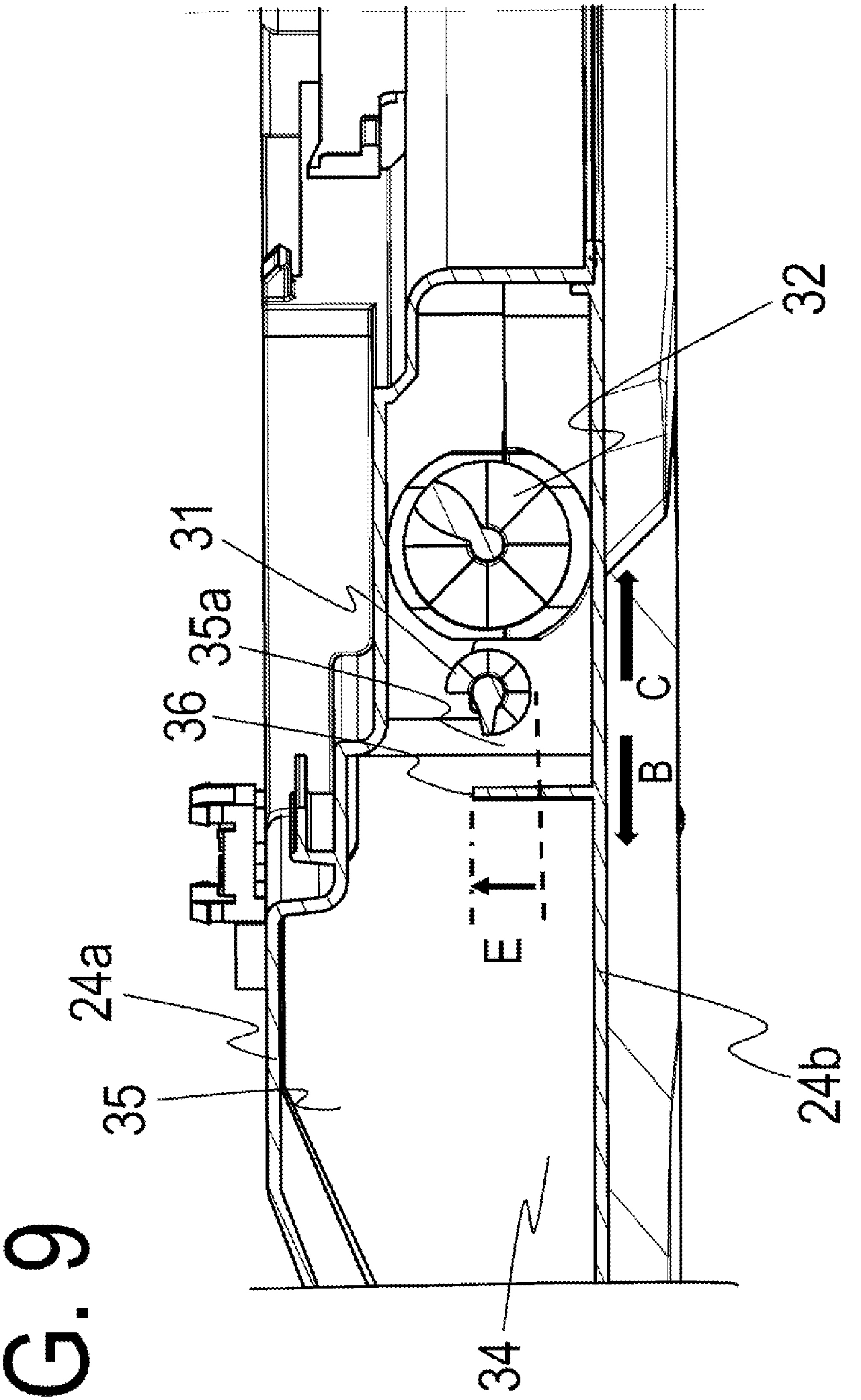
FIG. 9 is a view illustrating the state of toner collection in the embodiment 1 of the present invention.
Figure 10:
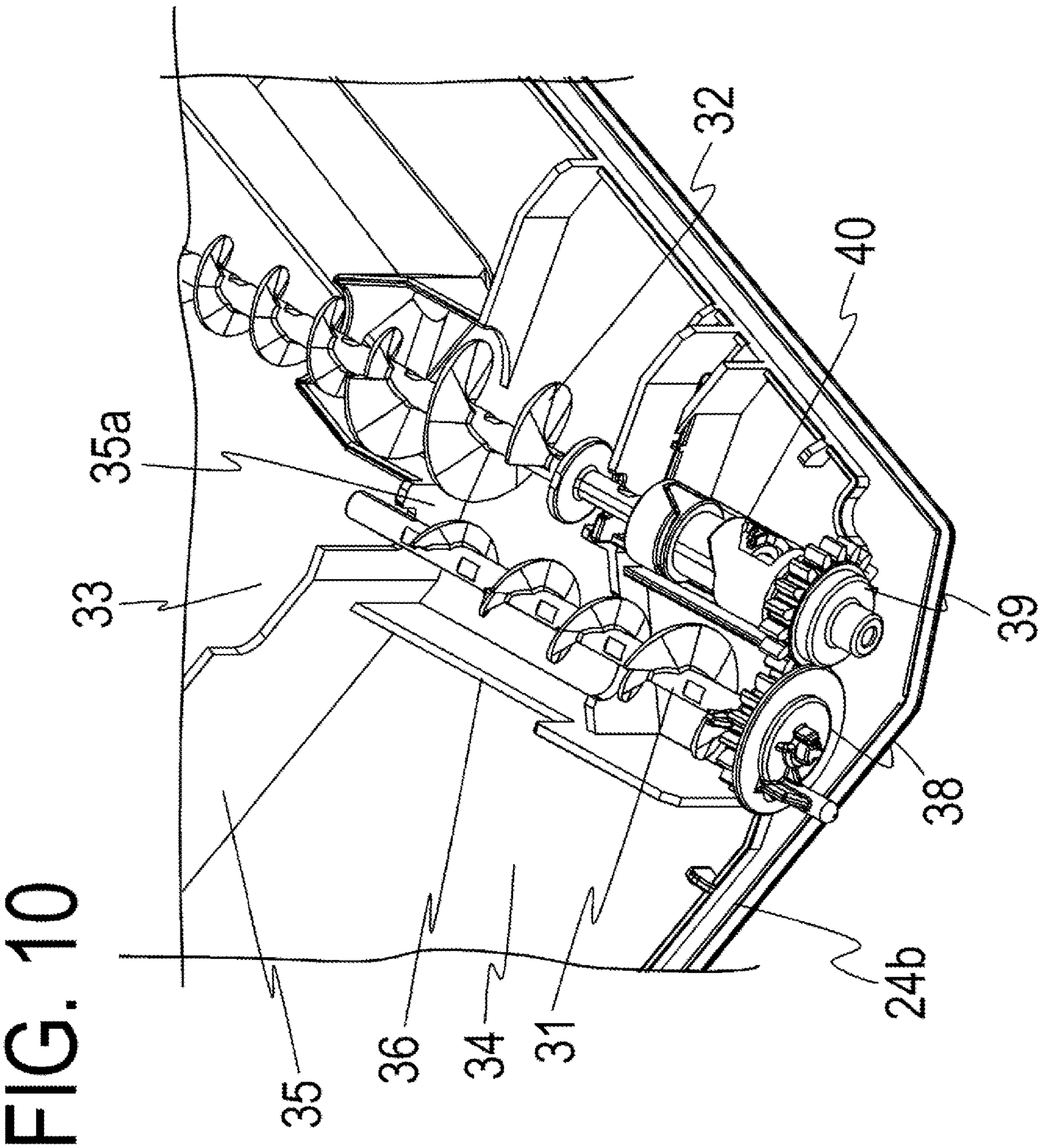
FIG. 10 is a view illustrating the state of toner collection in the embodiment 1 of the present invention.

By using FIGS. 8, 9, 10, a behavior of the toner in the toner collecting container 24 will be described. FIG. 8 is an enlarged view of a vicinity of the second screw 32 from the toner supply port 30 in a state where the collecting-container upper part 24*a* is removed. FIG. 9 is a sectional view on a D-D line in a state where the collecting-container upper part 24*a* is placed. FIG. 10 is a perspective view of a vicinity of an area shown in FIG. 8 in the toner collecting container 24. The toner supplied from the toner supply port 30 is conveyed by the rotation of the first screw 31 to an arrow A direction. By means of the rotation of the first screw 31, the toner is conveyed until it hits a first-screw downstream partition 35*a* and collects on the downstream of the first screw 31. When the toner collects on the downstream of the first screw 31, it advances along a wall of the first-screw downstream partition 35*a* and spreads in directions of an arrow B and an arrow C. The position of the communication port 36 of the partition 35 is, as indicated by an arrow E, located on an upper side in a gravity direction of the lower end of the first screw 31. As a result, the toner is conveyed by the rotation of the second screw 32 until it enters the second accommodating chamber 34 before a level of the toner rises.

Figure 11:
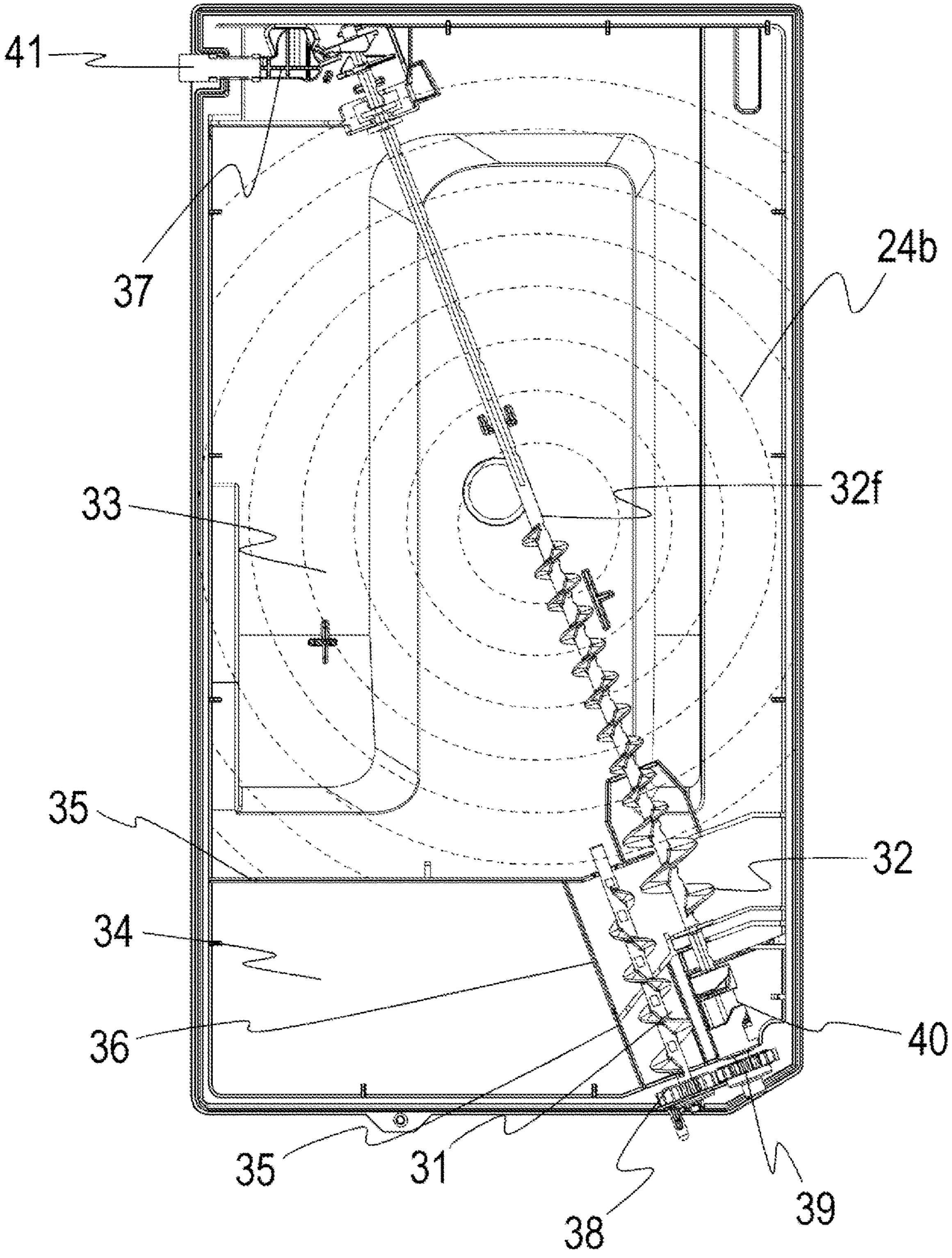
FIG. 11 is a view illustrating a state in which the toner collects in the embodiment 1 of the present invention.

When the toner reaches the second screw 32 disposed and aligned in parallel with the first screw 31, it is conveyed by the rotation of the second screw 32 in an arrow F direction to a vicinity of the center in the first accommodating chamber 33. The toner having been conveyed by the second screw 32 spreads concentrically and collects in the first accommodating chamber 33 from a screw end 32*f* of the second screw 32, as indicated by a broken line in FIG. 11.

By using FIGS. 1A to 1D, a behavior of the ratchet mechanism 40 when the toner is collecting will be explained in a time series. When there is little toner around the second screw 32, and a force required for drive is small, as shown in FIG. 1A, in a state where the coupling-side inclined surface 51*b* of the coupling member 51 and the rotating-side inclined surface 32*a* of the second screw 32 are in contact with each other, the second screw 32 of is driven by the coupling member 51. A position of the coupling member 51 shown in FIG. 1A is the first engagement position (first position). As the image forming apparatus 1 is continuously used, a periphery of the second screw 32 is filled with the toner, and a force (torque) required for driving the second screw 32 rises.

Figure 1B:
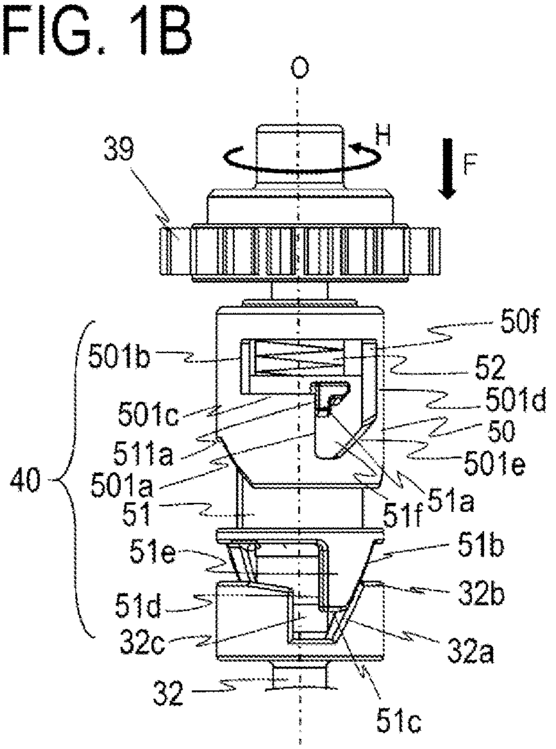
Figure 1C:
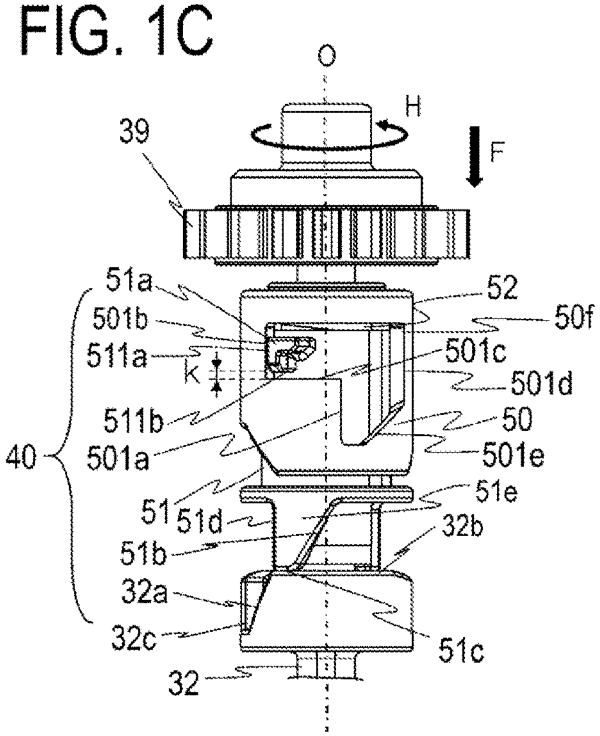

When the force required for driving the second screw 32 exceeds the force by the spring 52, as shown in FIG. 1B, the coupling-side inclined surface 51*b* moves on the rotating-side inclined surface 32 *a*. When further driven, as shown in FIG. 1C, the coupling member 51 moves, and a coupling-member planar portion 51*c* moves to a position where it contacts a rotating-member planar portion 32*b*. A position of the coupling member 51 shown in FIG. 1C is the second engagement position (second position). At the second engagement position, the coupling-side inclined surface 51*b* does not contact with the rotating-side inclined surface 32*a* and thus, the force by the spring 52 is not applied to the rotating-side inclined surface 32*a*. Thus, the force for driving the second screw 32 is not applied from the coupling member 51, and the rotation of the second screw 32 is stopped. When the drive member 50 rotates in the arrow H direction at the second engagement position, the second contact portion 501*b* of the drive member 50 and the first contacted portion 511*a* of the engagement rib 51*a* in the coupling member 51 contact and engage with each other, whereby the coupling member 51 is rotated.

Figure 1D:
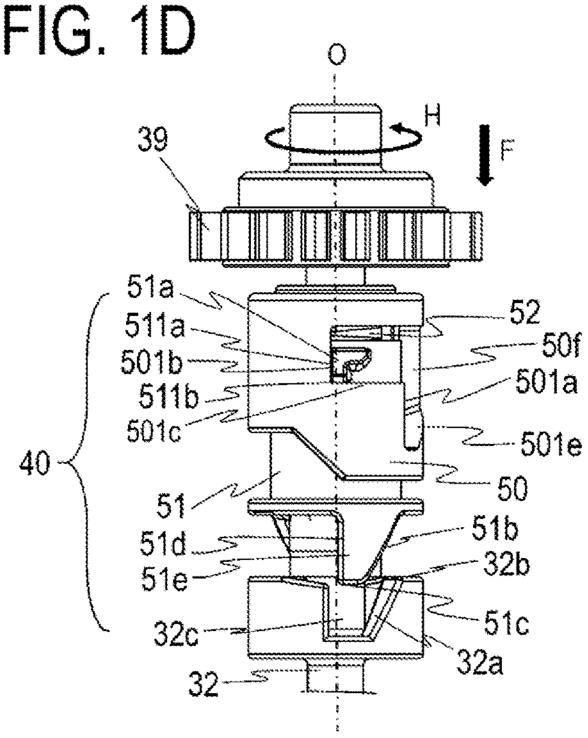

FIG. 1D shows a state where the coupling member 51 rotates from the state shown in FIG. 1C, and the coupling-side inclined surface 51*b* is rotated to a phase of a rotating-member groove portion 32*c*. The coupling member 51 is pressed by the biasing force of the spring 52 to a direction approaching to the second screw 32 and thus, it moves toward the second screw 32. The movement of the coupling member 51 is regulated at a position where the second contacted portion 511*b* of the engagement rib 51*a* and the drive-member planar portion 501*c* as a third contact portion of the drive member 50 contact each other. The drive-member planar portion 501*c* is a surface disposed by extending in a circumferential direction disposed so as to oppose the second axis direction with respect to the engagement rib 51*a* when the coupling member 51 is at the second engagement position and the second contact portion 501*b* is engaged with the first contacted portion 511*a* of the coupling member 51 by the rotation of the drive member 50 in the H direction. The drive-member planar portion 501*c* can be engaged with the coupling member 51 so as to regulate movement of the coupling member 51 to the first engagement position. The coupling member 51 moves only by a gap k between the second contacted portion 511*b* of the engagement rib 51*a* and the drive-member planar portion 501*c* at the second engagement position. This gap k is set smaller than a stroke amount in the rotation axis direction required for the coupling-side inclined surface 51*b* of the protruding portion 51*e* to contact the rotating-side inclined surface 32*a*. Therefore, in a non-drive transmitted state where the coupling member 51 is at the second engagement position, when the coupling member 51 and the second screw 32 idle, the coupling-side inclined surface 51*b* and the rotating-side inclined surface 32*a* do not contact each other. Alternatively, a degree of contact between the coupling-side inclined surface 51*b* and the rotating-side inclined surface 32*a* becomes smaller than a degree of contact in a drive transmitted state where the coupling member 51 is at the first engagement position. As a result, generation of a collision sound caused by the contact between the coupling-side inclined surface 51*b* and the rotating-side inclined surface 32*a* can be prevented or the collision sound can be reduced. Since the collision sound during the movement becomes smaller by reducing the gap k, the gap between the second contacted portion 511*b* of the engagement rib 51*a* and the drive-member planar portion 501*c* at the second engagement position is preferably as small as possible. The gap k is formed by the contact between the coupling-member planar portion 51*c* and the rotating-member planar portion 32*b*, but it is preferable that a part of the rotating-member planar portion 32*b* is made an inclined surface so that the gap k becomes smaller little by little. As a result, the collision sound can be further reduced.

When the second screw 32 is stopped, the lever 37 interlocking with the second screw 32 is also stopped. A detecting method when the lever 37 is stopped is such that, when there is no switching between shielding and transmission in a detection result of the photosensor 41 within time of one rotation of the second screw 32, it is determined to be stop. Since the stop of the lever 37 means that the toner collects in the first accommodating chamber 33, it is notified to a user that a replacement timing of the toner collecting container 24 is coming soon (hereinafter, it is described as a replacement advance notice). By giving the replacement advance notice to the user, a period for preparation of the new toner collecting container 24 can be provided.

In this embodiment, it is configured such that a rib shape of the engagement rib 51*a* is provided in the coupling member 51, and the first contact portion 501*a* or the second contact portion 501*b* is provided in the drive member 50 so that they are engaged with each other, but it may have such a relationship that the rib shape is provided in the drive member 50, and the coupling member 51 has two contact portions. Moreover, in this embodiment, the coupling-side inclined surface 51*b* of the coupling member 51 and the rotating-side inclined surface 32*a* of the second screw 32 do not have to be complete inclined surfaces but may be curved surfaces having large curvatures as long as they can be driven by the contact between the surfaces, and the effect of this embodiment is not lost.

Figure 12A:
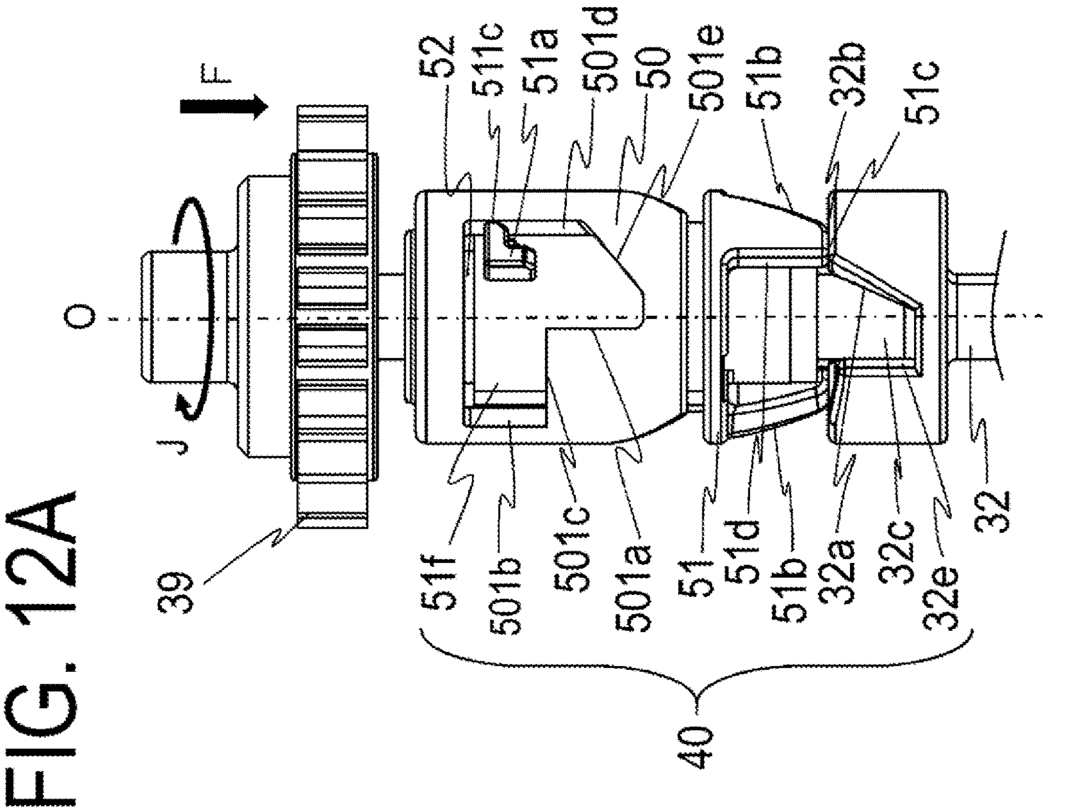
FIGS. 12A and 12B are explanatory views of a behavior when the ratchet mechanism rotates reversely in the embodiment 1 of the present invention.
Figure 12B:
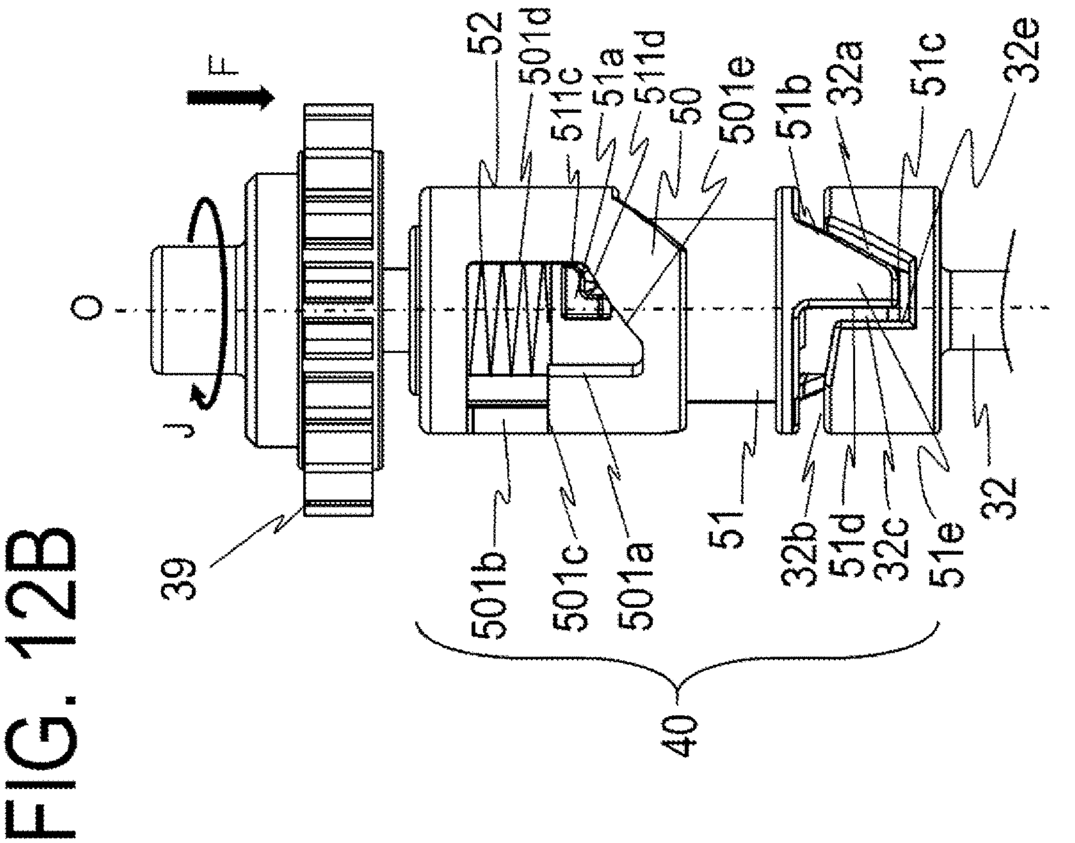

Here, when the coupling member 51 comes to the second engagement position, it does not return to the first engagement position even if it continuously rotates in the H direction. FIGS. 12A and 12B show a behavior when the drive member 50 is rotated in the H direction and is rotated reversely to the J direction from the position in FIG. 1D, and the coupling member 51 is moved from the second engagement position to the first engagement position.

The drive member 50 has the fourth contact portion 501*d* opposed to the third contacted portion 511*c* of the engagement rib 51*a* in the J direction and capable of engagement when the coupling member 51 is at the second engagement position. Moreover, the drive member 50 has the drive-portion inclined surface 501*e* as a fifth contact portion opposed to the third contacted portion 511*c* of the engagement rib 51*a* in the J direction and capable of engagement when the coupling member 51 is at the first engagement position. The drive-portion inclined surface 501*e* is an inclined surface inclined so as to extend toward the J direction as it extends toward the downstream side in the toner conveying direction F, that is, an inclined surface inclined such that an upstream end in the toner conveying direction F is an upstream end in the J direction and a downstream end in the toner conveying direction F is a downstream end in the J direction. The engagement rib 51*a* has the fourth contacted portion 511*d*, which is an engagement inclined surface inclined so as to extend toward the J direction as it extends toward the downstream side in the toner conveying direction F, on the downstream side in the H direction opposed to the fourth contact portion 501*d* and the drive-portion inclined surface 501*e* (downstream side in the H direction of the third contacted portion 511*c*). The second screw 32 has a rotating-side side surface 32*e* as a second drive transmitted portion, capable of contacting the coupling-side side surface 51*d* of the protruding portion 51*e* in the H direction and extending along the rotation axis O, when the coupling member 51 is at the first engagement position, and the drive member 50 rotates in the J direction.

When the drive member 50 rotates in the J direction in a state where the coupling member 51 is at the first engagement position, first, the fourth contact portion 501*d* and the fourth contacted portion 511*d* of the engagement rib 51*a* contact and engage with each other. As the result of this engagement, the coupling member 51 rotates in the J direction by the drive force received from the drive member 50. When it further rotates in the J direction from the state shown in FIG. 12A, and when the coupling-side inclined surface 51*b* rotates to the rotating-member groove portion 32*c*, since the coupling member 51 is pressed by the biasing force of the spring 52 to the second screw 32 side, the coupling member 51 moves to the first engagement position shown in FIG. 1A. In this movement, such a state as shown in FIG. 12B is brought about that the fourth contacted portion 511*d* of the engagement rib 51*a* and the drive-portion inclined surface 501*e* contact each other. Since the fourth contacted portion 511*d* of the engagement rib 51*a* and the drive-portion inclined surface 501*e* contact between the inclined surfaces inclined with respect to the rotation axis direction as described above, the collision sound when the coupling member 51 returns to the first engagement position is reduced. Moreover, in the subsequent further movement of the coupling member 51 to the downstream side in the toner conveying direction F, too, the coupling member 51 is moved to the side approaching to the second screw 32 little by little through sliding between the inclined surfaces and thus, the collision sound between the protruding portion 51*e* and the rotating-member groove portion 32*c* is also reduced.

As described above, by using the configuration of driving/coupling of the ratchet mechanism 40 for the configuration illustrated in this embodiment, the sound generated in the ratchet mechanism 40 can be reduced. That is, it is so configured that periodic collisions between the coupling member and the driven member generated during idling of the coupling member in the non-drive transmitted state in the conventional ratchet mechanism is not generated in the ratchet mechanism 40 of this embodiment. Moreover, it is also configured such that an impact of a collision between the coupling member and the driven member generated at the switching from the non-drive transmitted state to the drive transmitted state is alleviated by providing the inclined surface on the contact portion in the ratchet mechanism 40 of this embodiment. Therefore, generation of an impact sound during an operation of the ratchet mechanism 40 is suppressed, and the image forming apparatus 1 whose noise is reduced can be provided to the user.

A typical configuration to which the drive transmission mechanism of the present invention is applied is a powder conveying device which conveys a powder such as a toner as a developer in the image forming apparatus, but the present invention may be also applied to the other drive transmitting portions in the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-205742, filed on Dec. 20, 2021, which is hereby incorporated by reference herein in its entirety.

What is claimed is:

1. A drive mechanism used in an image forming apparatus, the drive mechanism comprising:

a rotatable drive member having a first engagement portion;

a coupling member having a second engagement portion engaged with the first engagement portion and a drive transmitting portion, the coupling member being constituted to be rotatable by receiving a drive force from the drive member in the second engagement portion and movable between a first position and a second position in a rotation axis direction of the drive member;

a biasing member disposed between the drive member and the coupling member in the rotation axis direction, the biasing member biasing the coupling member from the second position toward the first position; and a driven member having a first drive transmitted portion capable of contacting with the drive transmitting portion which moves along the first rotation direction in a case where the coupling member is at the first position and the drive member rotates in a first rotation direction, the driven member being constituted to be rotatable in the first rotation direction by receiving the drive force from the coupling member in the first drive transmitted portion, wherein the first engagement portion includes:

a first contact portion capable of contacting with the second engagement portion in a case where the coupling member is at the first position and the drive member rotates in the first rotation direction;

a second contact portion capable of contacting with the second engagement portion in a case where the coupling member is at the second position and the drive member rotates in the first rotation direction; and a third contact portion capable of contacting with the second engagement portion so as to regulate movement of the coupling member from the second position to the first position in the rotation axis direction in a case where the coupling member is at the second position and the second contact portion and the coupling member are in a contact state by rotation of the drive member in the first rotation direction.

2. The drive mechanism according to claim 1, wherein the first engagement portion further includes:

a fourth contact portion capable of contacting with the second engagement portion in a case where the coupling member is at the first position and the drive member rotates in a second rotation direction which is a direction opposite to the first rotation direction; and a fifth contact portion capable of contacting with the second engagement portion in a case where the coupling member is at the second position and the drive member rotates in the second rotation direction.

3. The drive mechanism according to claim 2, wherein in a case where the coupling member is at the second position and the drive member rotates in the second rotation direction, the second engagement portion receives a drive force from the fourth contact portion or the fifth contact portion and rotates in the second rotation direction and the coupling member moves from the second position to the first position by a biasing force of the biasing member.

4. The drive mechanism according to claim 3 wherein the driven member has a second drive transmitted portion capable of contacting with the drive transmitting portion in a case where the coupling portion is at the first direction and the drive member rotates in the second rotation direction, the driven member is rotatable in the second rotation direction by receiving a drive force from the coupling member in the second drive transmitted portion.

5. The drive mechanism according to claim 3, wherein the fifth contact portion is constituted by an inclined surface, the inclined surface being inclined such that, in the rotation axis direction, an upstream end in a direction from the second position toward the first position is an upstream end in the second rotation direction, and a downstream end in a direction from the second position toward the first position is a downstream end in the second rotation direction.

6. The drive mechanism according to claim 5, wherein the second engagement portion has a contact portion in contact with the fifth contact portion; and in a case where the coupling member moves from the second position to the first position, the contact portion contacts the fifth contact portion.

7. The drive mechanism according to claim 1, wherein the drive member is a cylindrical member having an opening portion opened in an outer peripheral surface of a cylinder portion;

the coupling member has an insertion portion inserted into an inner cylinder portion of the drive member and a protruding portion protruding in a radial direction with respect to the rotation axis from an outer peripheral surface of the insertion portion so as to be inserted into the opening portion; and the first engagement portion is provided in the opening portion.

8. The drive mechanism according to claim 1, wherein the drive transmitting portion has a drive inclined surface, the drive inclined surface being inclined so as to extend toward a second rotation direction, which is a direction opposite to the first rotation direction as extending further toward a first axis direction, which is a direction along the rotation axis direction and in which the coupling member is moved from the second position to the first position;

the first drive transmitted portion is an inclined surface inclined so as to extend toward the first rotation direction as extending further toward a second axis direction which is a direction opposite to the first axis direction; and the drive inclined surface is capable of contacting with the inclined surface of the first drive transmitted portion in the first rotation direction in a case where the coupling member is at the first position and the drive member rotates in the first rotation direction.

9. The drive mechanism according to claim 8, wherein the coupling member is constituted to be maintained at the first position while a reaction force that the drive inclined surface receives from the inclined surface of the first drive transmitted portion is smaller than a biasing force of the biasing member acting on the coupling member and to move to the second position in a case where the reaction force becomes larger than the biasing force.

10. The drive mechanism according to claim 1, wherein the driven member is a screw which conveys a toner.

11. An image forming apparatus, comprising:

an image forming portion which forms an image on a recording material by using toner;

a container including an accommodating portion which accommodates the toner;

a screw which conveys the toner accommodated in the accommodating portion; and the drive mechanism according to claim 1, which rotates/drives the screw as the driven member.

* * * * *